(12) United States Patent
Morley

(10) Patent No.: US 9,313,399 B2
(45) Date of Patent: Apr. 12, 2016

(54) SYSTEM AND METHOD FOR IDENTIFYING PEOPLE IN AN IMAGE

(71) Applicant: QUALCOMM Incorporated, San Diego, CA (US)

(72) Inventor: Stewart Morley, Sutton Coldfield (GB)

(73) Assignee: QUALCOMM Incorporated, San Diego, CA (US)

( * ) Notice: Subject to any disclaimer, the term of this patent is extended or adjusted under 35 U.S.C. 154(b) by 279 days.

(21) Appl. No.: 13/918,651

(22) Filed: Jun. 14, 2013

(65) Prior Publication Data

US 2014/0368670 A1 Dec. 18, 2014

(51) Int. Cl.
*H04N 5/232* (2006.01)
*H04N 1/32* (2006.01)
*H04W 4/02* (2009.01)

(52) U.S. Cl.
CPC ....... *H04N 5/23229* (2013.01); *H04N 1/32106* (2013.01); *H04W 4/021* (2013.01); *H04W 4/023* (2013.01)

(58) Field of Classification Search
None
See application file for complete search history.

(56) References Cited

U.S. PATENT DOCUMENTS

| 8,339,469 | B2 | 12/2012 | Vau et al. | |
|---|---|---|---|---|
| 2004/0263631 | A1 | 12/2004 | Brittan et al. | |
| 2005/0096084 | A1 | 5/2005 | Pohja et al. | |
| 2006/0110154 | A1 | 5/2006 | Hulsen et al. | |
| 2007/0255785 | A1 | 11/2007 | Hayashi et al. | |
| 2010/0311347 | A1* | 12/2010 | Le Thierry D'Ennequin et al. | 455/67.11 |
| 2011/0275317 | A1 | 11/2011 | Ryu | |
| 2012/0027256 | A1* | 2/2012 | Kiyohara | G06F 17/30029 382/103 |
| 2012/0076354 | A1 | 3/2012 | Price et al. | |
| 2012/0178369 | A1 | 7/2012 | Kim | |
| 2012/0278387 | A1* | 11/2012 | Garcia et al. | 709/204 |
| 2014/0140575 | A1* | 5/2014 | Wolf | 382/103 |
| 2014/0203073 | A1* | 7/2014 | Braun | 235/375 |

FOREIGN PATENT DOCUMENTS

WO 2011133590 A1 10/2011

OTHER PUBLICATIONS

International Search Report and Written Opinion—PCT/US2014/038992—ISA/EPO—Sep. 19, 2014.

* cited by examiner

*Primary Examiner* — Nirav G Patel
(74) *Attorney, Agent, or Firm* — Knobbe, Martens, Olson & Bear LLP

(57) ABSTRACT

Described herein are methods and devices employing low power wireless features to identify persons in a captured image using signals emitted from such persons' personal computing devices. As described, signals emitted from personal computing devices commonly carried on a person, such as cell phones, enable an image capture device to wirelessly connect to the personal computing devices, both directly and through a mesh network, and to obtain information about the person carrying the device. Further, the image capture device may determine the location of the personal computing devices to tag locations of persons in a captured image. Some embodiments may allow the image capture device to automatically share the captured image, such as by email, text, or social networking websites and applications. It is also possible to create a local group of users who will be identified by the image capture device, or to operate in a publicly detectable mode.

32 Claims, 8 Drawing Sheets

SYSTEM AND METHOD FOR IDENTIFYING PEOPLE IN AN IMAGE

TECHNICAL FIELD

The present embodiments relate to imaging devices, and in particular, to systems and methods that enable identification of persons in a photograph using signals emitted from such persons' mobile device, or any other compatible device.

BACKGROUND

Digital imaging capabilities have been integrated into a wide range of devices, including digital cameras, tablet computers, and mobile phones. Digital imaging devices or image capture systems can refer to any device that can capture one or more digital images, including devices that capture still images or videos.

Many mobile devices, such as mobile phones and tablet computing devices, include cameras that may be operated by a user to capture still and/or video images. In various conventional devices, facial recognition techniques are implemented to identify persons in a photo. However, a person whose face is obscured, such as by another person or object or in shadow, may not be identified by facial recognition techniques. Further, this particular solution is not very robust because it does not identify the particular persons in the photo or enable the photo to be sent or linked to the persons through contact information or social networking. Accordingly, it can be desirable to provide imaging systems for mobile devices with the capability to track and identify persons in an image.

SUMMARY

The image capture and device networking techniques described provide a way to locate and identify the location of particular people or objects in a captured image, such as by using a signal emitted from a person's mobile telephone. In one embodiment a mobile device of a person in the image may transmit information to the image capture device, such as contact information or social networking presences, such that the image capture device may automatically send the image to or link the image with the person. This may be implemented, in some circumstances, in a crowd of mesh networked devices.

In some circumstances, a local group may be created which pre-identifies the devices which will connect for image capture and sharing. In other circumstances, a user may enable a public connection mode, and may communicate with any device within range. It may be useful for a person to specify individual preferences for privacy settings regarding sharing of information with connected image capture devices and also regarding treatment of images taken of them, and for the person's wireless device to automatically transmit these settings to an image capture device in communication with the person's personal wireless device. The image capture device may be programmed to automatically comply with any transmitted privacy preferences when sharing or uploading captured images. In some cases, a user may desire to disable their device's capability to transmit their information to other devices.

Some of the present embodiments may include techniques for detecting persons in a captured image, obtaining information about such persons from their personal wireless devices, and storing the captured image in association with information about the persons in the image. Certain embodiments may include techniques for sharing images via contact information or social networking. Other embodiments may include techniques for allowing the users to create a group of linked devices with specified sharing settings, or to enable a public sharing setting which detects any nearby device.

According to an embodiment, an imaging system may comprise an image capture device comprising a communication module having a wireless communication range, the communication module configured to communicate with a plurality of personal computing devices, a location triangulation module configured to determine a location of each of the plurality of personal computing devices, an image capture module configured to capture a target image of a scene, and a tagging module configured to identify which, if any, of the personal computing devices are located within a range of the scene; wherein each of the plurality of personal computing devices is configured to transmit user information to the image capture device.

In some embodiments of the imaging system, at least some of the plurality of personal computing devices may be located outside of the wireless communication range of the image capture device, and the devices located outside of the wireless communication range may be configured to form a mesh network with the image capture device. The image capture device may be configured to periodically check for new personal computing devices within the wireless communication range and may be configured to check for new personal computing devices within the mesh network.

In another embodiment, a method of capturing a target image using an image capture device may comprise connecting to at least one personal computing device located on or near a person in the target image; determining a location of the at least one personal computing device; reading information from the at least one personal computing device regarding the person; and associating the information with the target image.

DETAILED DESCRIPTION

Figure 1:
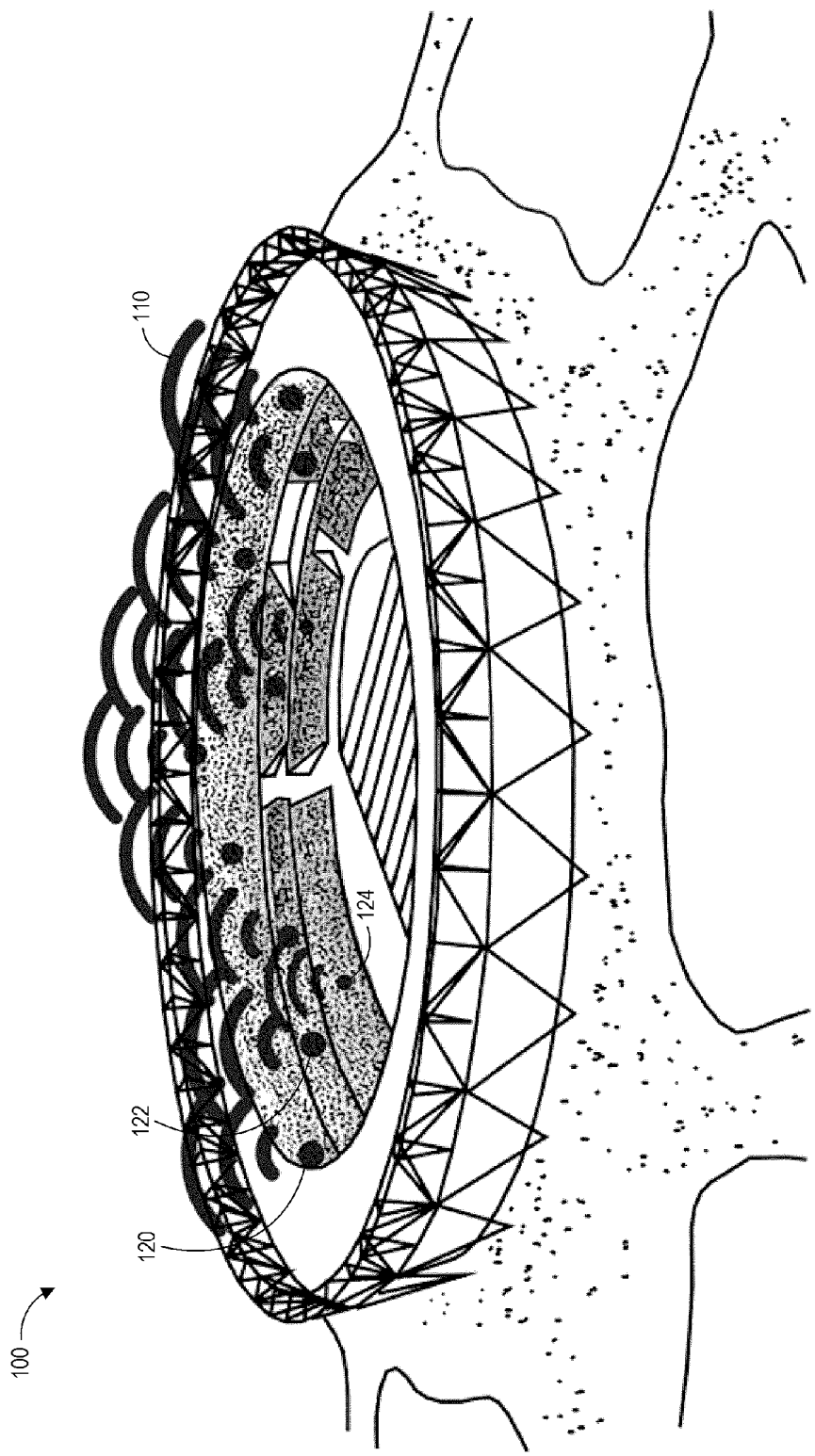
FIG. 1 illustrates an embodiment of a networked image capture system.

One embodiment relates to systems, methods and apparatus for capturing an image and detecting the location of persons in the image. Often, image capture devices, such as digital cameras, will be equipped with facial recognition processes. Such processes, being based on facial features alone, may not always detect a person in a photo, and are unable to provide information regarding the person. Thus, some embodiments provide systems and methods for communicating with a personal computing device of a person in the range of the target image scene. Particularly, some embodiments described herein relate to a networked image capture system which receives information from personal computing devices, tracks the location of the personal computing devices, and then tags the users of those devices in the captured image based on the location of each user's computing device. For example, a person's mobile phone is generally carried with the person at all times, and if authorized may transmit the GPS location, name, email address, and social networking presences of the person to a linked image capture device. In some embodiments, the image capture device may be configured to automatically share the captured image with the person via the information provided.

One skilled in the art will recognize that these embodiments may be implemented in hardware, software, firmware, or any combination thereof. Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

Turning now to FIG. 1, an embodiment of an exemplary networked image capture system 100 is depicted in the context of a sporting event in a stadium. However, it will be appreciated that such a system 100 could be implemented in any crowd environment, for example festivals, theme parks, political rallies, concerts, etc.

Depicted above the crowd within the stadium are a plurality of wireless signals 110. Each signal may be emitted from a personal computing device of a person in the crowd. To illustrate, a first device 120 belonging to a first person may be in a communication range of a second device 122 belonging to a second person, and the second device 122 may be in a communication range of a third device 124 belonging to a third person. For example, the communication range may be an area in which Wi-Fi, Bluetooth, or any other wireless personal area network connection, enables transmission of data between two devices. The devices 120, 122, 124 may operate in a publicly-detectable mode in which any in-range device may detect and network with the devices 120, 122, 124.

In some embodiments, the first, second, and third device 120, 122, and 124 may be configured to operate as nodes in a mesh network or mobile ad hoc network. The mesh network may include some or all of the devices emitting the plurality of wireless signals 110. Each node in the network may be equipped to link to other devices within communication range. Each node may be further equipped to forward or route information through the network. Because each node, being a portable personal computing device, is capable of movement relative to the other network nodes, each node may be configured to update its connections to other nodes based on what nodes are currently in communication range. The mobility of the nodes may result in frequent changes in network topology. In some embodiments, the network may be dynamic and configured for continuous or periodic connection and reconfiguration around broken paths, or reconfiguration due to the mobility of the nodes.

To illustrate an implementation of a mesh or mobile ad hoc network, the third device 124 is illustrated as being out of the communication range of the first device 120 but in the communication range of the second device 122. The second device 122 is in the communication range of the first device 120. Therefore, the second device 122 may connect to both the first device 120 and the third device 124. Although the first device 120 and the third device 124 are not directly connected, information from the third device 124 may be passed to the first device 120 via the second device 122, and vice versa. This may be implemented on a larger scale using the plurality of signals 110 to form a network covering some or all of the crowd in the stadium.

Each device may determine or approximate the location of each connected device and may share such location information with the network. For example, the location may be determined based on coordinates of connected devices. The coordinates may be provided by a space-based satellite navigation system such as GPS or GNSS, or by an indoor positioning and tracking system such as radio-frequency identification (RFID) systems, received signal strength indication (RSSI) systems, or iGPS using tracking sensors and infrared laser transmitters to create a measurement field. In some embodiments the location may be approximated based on a known area of the device's communication range. In other embodiments, the user of each device may provide the location information, for example a seat location within the stadium. In some embodiments, when the user of first device 120 captures an image of the stadium using the device 120, the device 120 may determine based at least in part on the location information that the second device 122 is present in the image. As discussed below, the first device may be able to share the image with the user of the second device 122.

Other types of information may be shared across the network. In some embodiments, contact information of a user of a device may be made available, such as a mobile phone number, email address, or social networking presence(s) of the user. Names of the device users may also be made available. In the example above in which device 120 determined that device 122 was present in the captured image, device 120 may use the contact information of the user of device 122 to share the captured image with the user of device 122. For example, device 120 may send the photo to the user of device 122 through a message to the user's mobile number or email. The device 120 may upload the image to a social networking website and "tag" the user of device 122. In an embodiment, a professional camera being used to capture video or still images of the event in the stadium may also connect to the network and may be configured to alert the people determined to be in a captured image that they may view themselves in the professionally-captured footage.

Sharing and/or privacy preferences of a user may also be shared with the network. Sharing information may comprise preferences about how images captured of the user are shared.

For instance, a user may elect that images will be shared with them only through email. As another example, a user may specify that they must approve tags of images of the user on social networking sites. In some embodiments, a user may specify that images will automatically be shared with another person, such as a child choosing automatically sharing photos with their parent while on a school field trip. The user of each device acting as a node in the network may also set privacy preferences which control the types of contact information that will be shared with the network. For example, a user may elect to share some contact information but withhold other information, such as sharing social networking presences but withholding mobile phone number and email address. Other users may not wish to share any information with the network, operating only as a data-routing node.

Information may be shared with the mesh network in a variety of ways. In some embodiments, each device may be configured to receive, locally store, and optionally periodically update shared information. In other embodiments the devices within the mesh network may also be linked to a larger network, such as the Internet. The shared information may be stored globally within the larger network and may be accessed as needed by the nodes within the mesh network. For example, the location information, contact information, and privacy preferences transmitted from each node may be stored in a database accessible through the Internet by other devices within the mesh network. In one embodiment, each node may provide the database with data comprising that node's location and a list of connected nodes. The node may also provide the database with data comprising one or more of mobile number, email address, social networking presences, sharing preferences, and privacy preferences. Other nodes may access this information as needed, such as for sharing captured images.

Figure 2A:
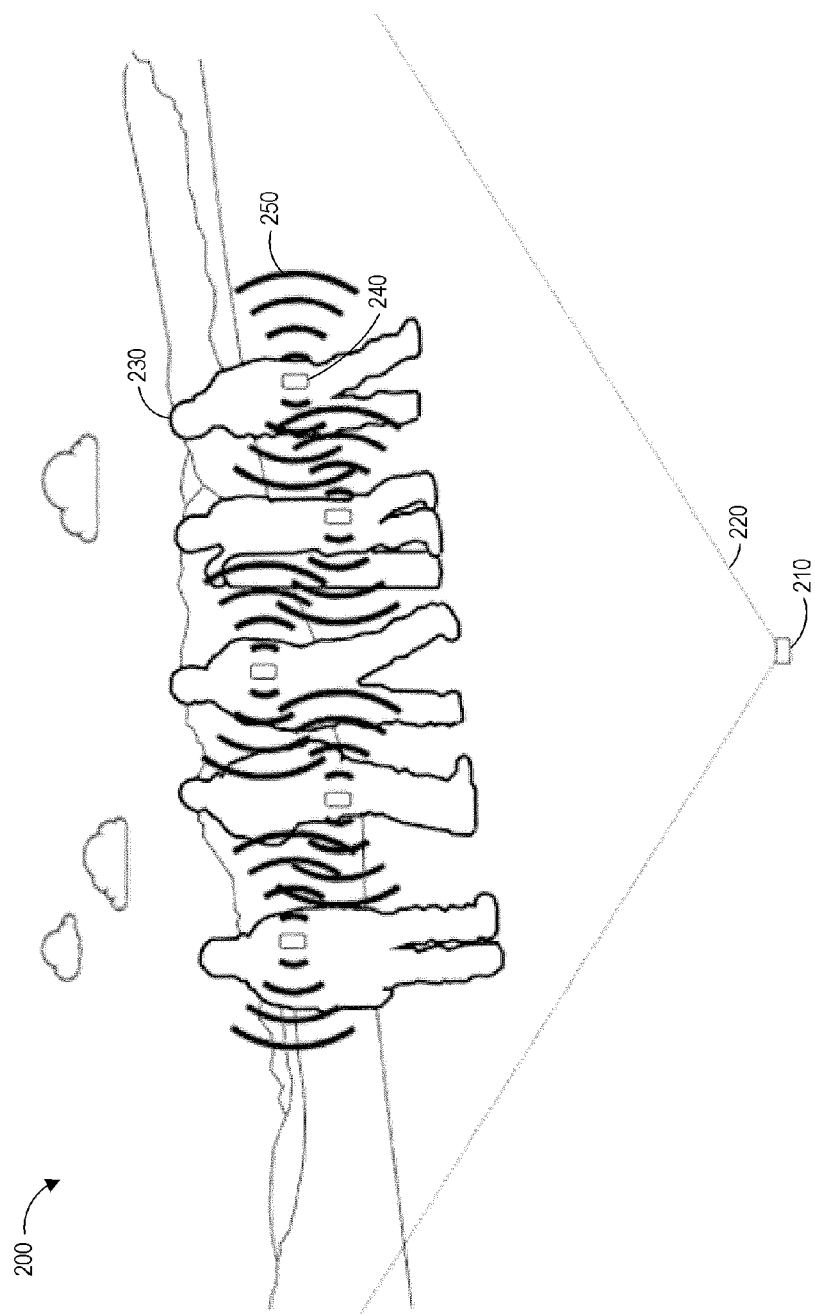
FIG. 2A illustrates another embodiment of a networked image capture system.
Figure 2B:
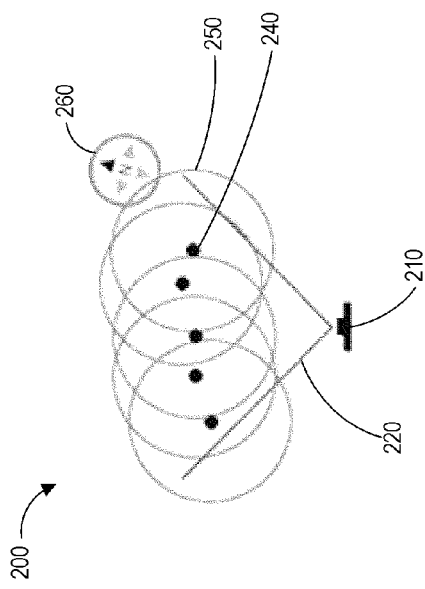
FIG. 2B illustrates another view of the system of FIG. 2A.

Referring now to FIGS. 2A and 2B, another embodiment of an exemplary networked image capture system 200 will now be described in greater detail. As shown in FIG. 2A-B, wireless identification image capture system 200 comprises an image capture device 210 having a range of view 220 and a plurality of personal computing devices such as device 240, the device 240 carried by a user 230 and having a wireless communication range 250. Although not illustrated, the image capture device 210 may also have a wireless communication range. Image capture device 210 may also comprise a compass 260 for providing location information of captured images. Although the compass 260 is displayed outside of the image capture device 210, this is for purposes of illustrative clarity and it will be appreciated that compass 260 may be incorporated into image capture device 210.

Although the image capture device 210 shown is a camera, it will be understood by those skilled in the art that this is for purposes of illustration only and that the wireless identification image capture system 200 may be implemented in a variety of image capture devices such as an electronic camera, video recorder, a web camera, a camera built into a portable or mobile computer, including but not limited to, a cellular telephone, smart phone, portable media player, personal digital assistant, a laptop, or a tablet computer. Image capture device 210 may be a digital camera, such as a digital video camera, a digital still image camera, or a combination of both. Image capture device 210 may be a stand-alone device, such as a stand-alone camera, or be integrated in another multi-purpose device, such as a wireless communication device. Image capture device 210 may also be equipped to capture color imagery, black-and-white imagery, or both. In this disclosure, the term "image," or similar terms may interchangeably refer to either video or still pictures.

The personal computing device 240 may be any portable computing device which is commonly carried on the person of user 230 and which is capable of network communications. It will be understood by those skilled in the art that the networking capabilities described herein may be employed in a variety of personal computing devices including but not limited to a cellular telephone, smart phone, digital camera, video recorder, portable media player, personal digital assistant, laptop, tablet computer, or a GPS.

In some embodiments, the users of image capture device 210 and the personal computing devices may create a local network. For example, in the illustrated example the users of the image capture device 210 and the personal computing devices have taken a holiday together. The users may decide to set up a private network of the devices of the persons on the trip, and the image capture device 210 and personal computing device 240 may operate in a privately-detectable mode, where only other devices in the private network may detect and communicate with image capture device 210 and personal computing device 240.

A user may, in certain embodiments, elect to always operate their personal computing device in a privately-detectable mode. The user may have a list or group of allowed devices which may connect to and exchange information with the user device. Devices not on the list of allowed devices would not be able to locate or exchange information with the user's personal computing device. Control of network preferences, sharing settings, privacy preferences, and user information may be enabled through software or a mobile application installed on the personal computing device.

As discussed above, personal computing device 240 may share information with the image capture device 210 such as location information, contact information, sharing preferences, and/or privacy preferences of the user 230. Image capture device 210 may use the location information of device 240 determine that user device 240 is within the range 220 of a captured image. In some embodiments, the image capture device may share the image with the use 230. In other embodiments, the image capture device may share the image with all users within the private network. The user 230 may specify sharing settings, for example images capture of user 230 may be automatically shared with a friend or spouse who was not able to take the trip with the user 230, or as another example the user 230 may specify that all images of user 230 should be sent to device 240 and then uploaded to an online photo album, such as on a social networking site.

Figure 3:
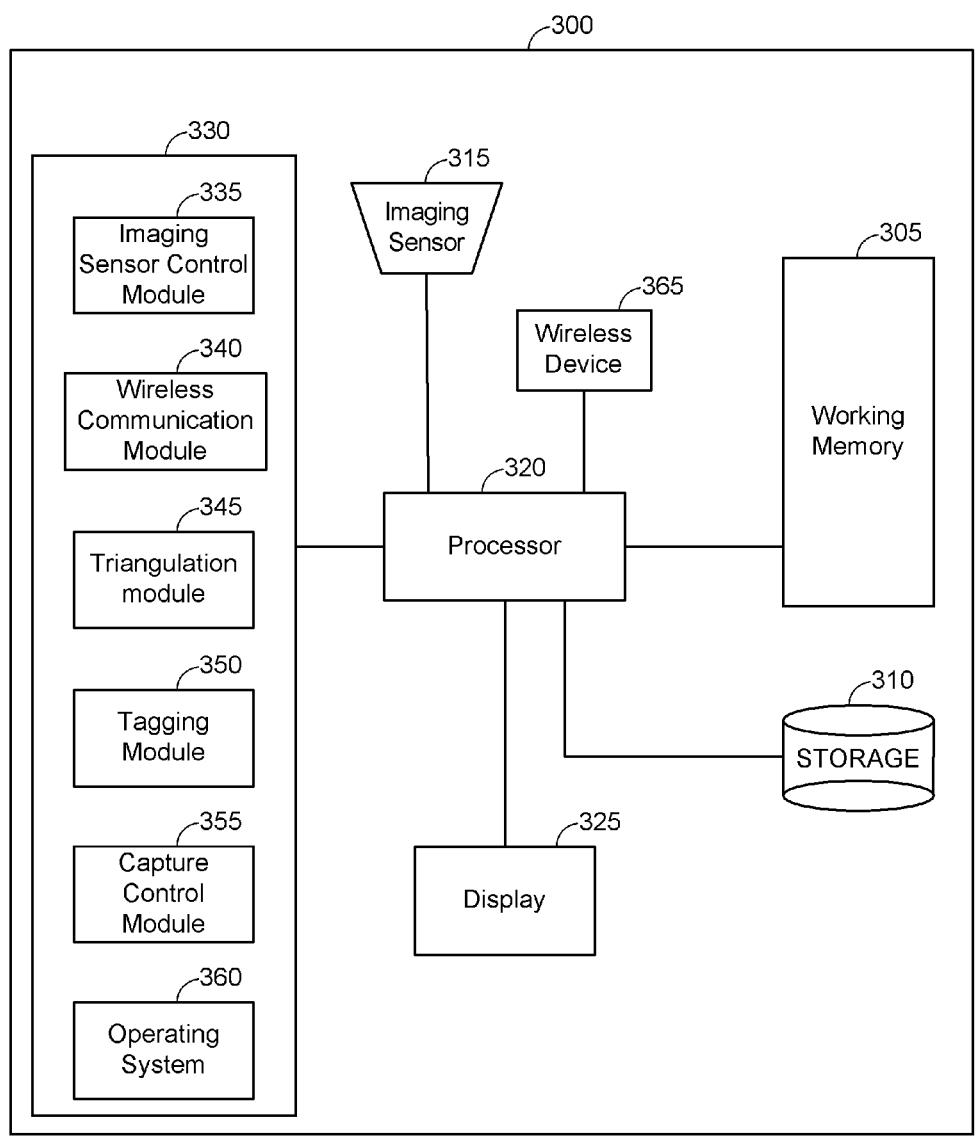
FIG. 3 illustrates an embodiment of a networking-capable image capture system.

FIG. 3 depicts a high-level block diagram of an image capture device 300 configured for connecting to personal computing devices of persons in a target image, the device 300 having a set of components including a processor 320 linked to an imaging sensor 315 and a wireless device 365. A working memory 305, storage 310, electronic display 325, and memory 330 are also in communication with the processor 320.

Device 300 may be a cell phone, digital camera, tablet computer, personal digital assistant, or the like. Device 300 may also be a more stationary device such as a security camera, desktop personal computer, video conferencing station, or the like that uses an internal or external camera for capturing images. For example, imaging sensor 315 may, in some embodiments, be separate from device 300, and may be replaced with a means for receiving or transmitting image data to device 300 of images captured by a separate device, such as by connection to an external memory. A plurality of applications may be available to the user on device 300. These applications may include traditional photographic applications as well as applications for managing received information of persons in captured images and for managing sharing of captured images.

The imaging sensor 315 can be, for example, a charge-coupled device (CCD), a complementary metal-oxide semiconductor (CMOS) sensor, or the like. The image sensor 315 may be coupled to the processor 320 to transmit a captured image to the image processor 320. The processor 320 may be configured to perform various image tagging techniques on a received captured image in order to output an image associated with data representing persons in the image, as will be described in more detail below.

Processor 320 may be a general purpose processing unit or a processor specially designed for imaging applications. As shown, the processor 320 is connected to a memory 330 and a working memory 305. In the illustrated embodiment, the memory 330 stores an imaging sensor control module 335, wireless communication module 340, facial recognition module 345, tagging module 350, capture control module 355, and operating system 360. These modules may include instructions that configure the processor to perform various image processing and device management tasks. Working memory 305 may be used by processor 320 to store a working set of processor instructions contained in the modules of memory 330. Alternatively, working memory 305 may also be used by processor 320 to store dynamic data created during the operation of device 300.

As mentioned above, the processor 320 is configured by several modules stored in the memories. The imaging sensor control module 335 includes instructions that configure the processor 320 to adjust the focus position of imaging sensor 315. The imaging sensor control module 335 also includes instructions that configure the processor 320 to capture images with the imaging sensor 315. The instructions may include programming specific to capture of images in a networked environment. Therefore, processor 320, along with image capture control module 335, imaging sensor 315, and working memory 305 represent one means for capturing an image using an imaging sensor.

Wireless communication module 340 includes instructions that configure the processor 320 to scan for signal-emitting network devices in the communication range of the image capture device, and also includes instructions to receive data from any connected devices. The wireless connection instructions may further include instructions for maintaining a mesh network and repairing paths in the network that are broken or lost due to other nodes moving out of range or turning off. The wireless communication module 340 may also include instructions for routing information through a mesh network.

After connecting with available devices, wireless communication module 340 may configure the processor 320 to ping the connected devices for information. In other embodiments, the connected devices may automatically transmit information to the image capture device 300. Wireless communication module 340 may also be configured to enable the device 300 to connect to the Internet. In some embodiments wireless communication module 340 may be configured to upload information to a database, the database accessible through the Internet and storing information about devices within a mesh network, and to access information about other networked devices from the database.

Triangulation module 345 configures the processor 320 to track the locations of networked devices during the image capture process, and may work in conjunction with the wireless communication module 340 and the tagging module 350 to identify the locations of persons in a captured image and tag such persons in the captured image. The locations of persons may be determined from the locations of such persons' mobile computing devices. For example, in some embodiments triangulation module 345 may determine or approximate the location of a connected device based on a variety of factors such as signal range and the strength of the detected signal. The triangulation module 345 may also use information about what devices within the network are and are not connected to one another in order to determine or approximate the location of each device. For example, the image capture device 300 may be connected to devices A, B, and C. Device A may be connected to device D. The triangulation module 345 would therefore determine that device D is farther from the image capture device 300 than device A. By analyzing the connection relationships within a network of multiple devices, the triangulation module 345 may be able to determine or approximate the location of devices which are not directly connected to the image capture device 300.

Tagging module 350 may configure the processor 320 to associate information about a user of a device determined to be in a captured image with the captured image. For example, the information may comprise contact information of the user, such as social networking presences of the user. The tagging module 350 may work in conjunction with the wireless communication module 340 to upload the captured image to an online album, for example a photo album on a social networking website, and to tag the user in the image.

Capture control module 355 may include instructions that control the overall image capture functions of the device 300. For example, capture control module 355 may include instructions that call subroutines to configure the processor 320 to use instructions from imaging sensor control module 335 to capture raw image data of a target image scene using the imaging sensor 315. Capture control module 355 may then call the wireless communication module 340 to network with available devices and track such devices. Capture control module 355 may then call facial recognition module 345 to identify the faces of users of any networked devices. If the detected users allow tagging of their photos, capture control module 355 may call tagging module 350 to associate location and contact information of the detected user with captured image data.

Operating system module 360 configures the processor 320 to manage the memory and processing resources of the device 300. For example, the operating system module 360 may include device drivers to manage hardware resources such as the electronic display 325, storage 310, or imaging sensor 315. Therefore, in some embodiments, instructions contained in the image processing modules discussed above may not interact with these hardware resources directly, but instead interact through standard subroutines or APIs located in operating system component 370. Instructions within operating system 370 may then interact directly with these hardware components.

The processor 320 may be further configured to control the display 325 to display identification information of detected users with the user of the image capture device. Some embodiments of the display may include a portion for displaying the names of detected networked users. The display 325 may be external to the imaging device 300 or may be part of the imaging device 300. The display 325 may also be configured to provide a view finder for a user prior to capturing an image, or may be configured to display a captured image stored in memory or recently captured by the user. The display 325 may comprise an LCD or LED screen, and may implement touch sensitive technologies.

Processor 320 may write data to storage 310, for example data representing captured images, detected networked users, and information associated with the detected networked users. While storage 310 is represented graphically as a traditional disk device, those with skill in the art would understand that the storage 310 may be configured as any storage media device. For example, the storage 310 may include a disk drive, such as a hard disk drive, optical disk drive or magneto-optical disk drive, or a solid state memory such as a FLASH memory, RAM, ROM, and/or EEPROM. The storage 310 can also include multiple memory units, and any one of the memory units may be configured to be within the image capture device 300, or may be external to the image capture device 300. For example, the storage module 310 may include a ROM memory containing system program instructions stored within the image capture device 300. The storage module 310 may also include memory cards or high speed memories configured to store captured images which may be removable from the camera.

Although FIG. 3 depicts a device comprising separate components to include a processor, imaging sensor, and memory, one skilled in the art would recognize that these separate components may be combined in a variety of ways to achieve particular design objectives. For example, in an alternative embodiment, the memory components may be combined with processor components to save cost and improve performance.

Additionally, although FIG. 3 illustrates two memory components, to include memory component 330 comprising several modules, and a separate memory 305 comprising a working memory, one with skill in the art would recognize several embodiments utilizing different memory architectures. For example, a design may utilize ROM or static RAM memory for the storage of processor instructions implementing the modules contained in memory 330. Alternatively, processor instructions may be read at system startup from a disk storage device that is integrated into device 300 or connected via an external device port. The processor instructions may then be loaded into RAM to facilitate execution by the processor. For example, working memory 305 may be a RAM memory, with instructions loaded into working memory 305 before execution by the processor 320.

Figure 4:
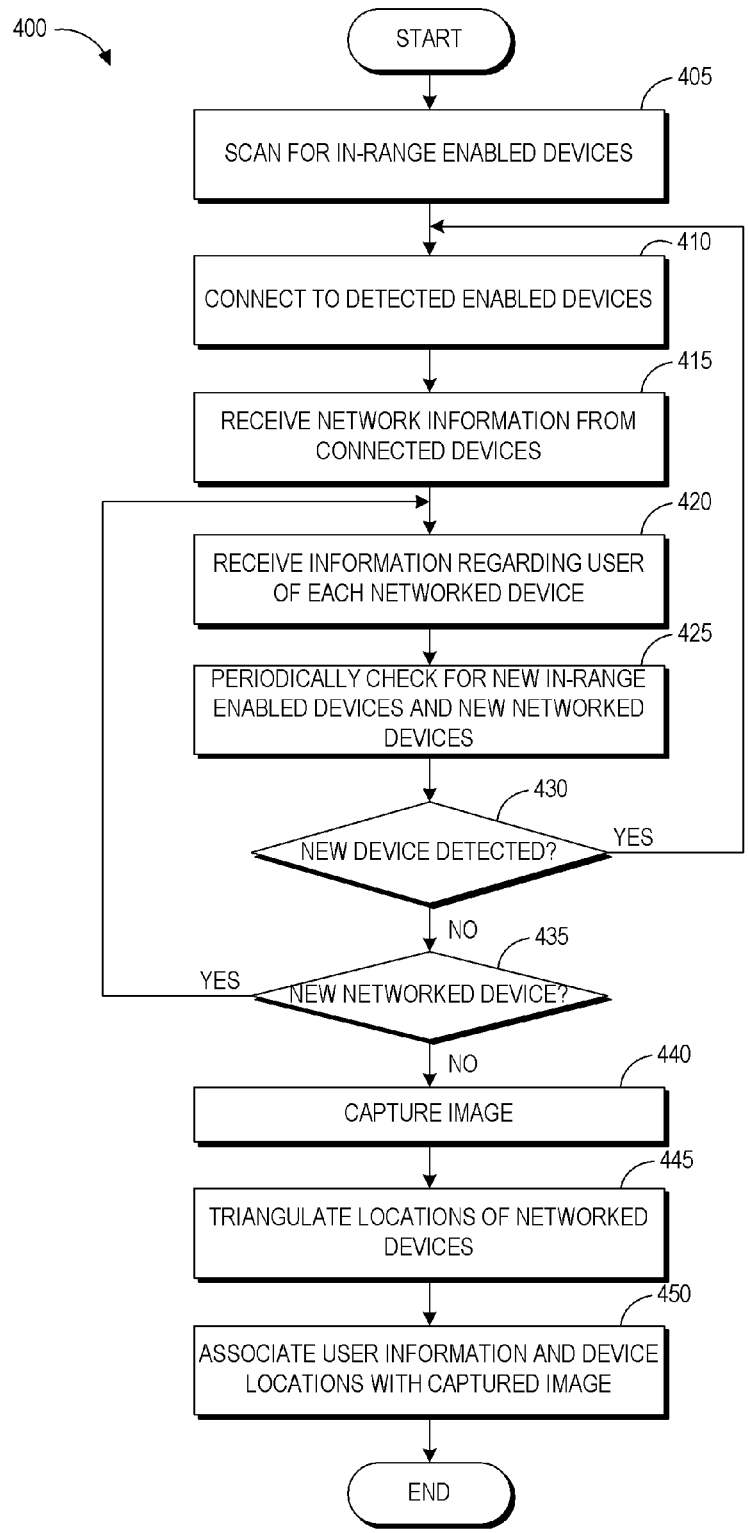
FIG. 4 illustrates an embodiment of a crowd tagging image capture system.

An embodiment of a wireless identification image capture process 400 will now be described with greater detail with respect to FIG. 4. The image capture process 400 may take place in a network system such as described above with respect to FIG. 1 or in the image capture device 300 of FIG. 3. The process begins at step 405, in which the image capture device scans for in-range enabled devices. An in-range device may be any portable computing device within the communication range of the image capture device which is capable of network communications with the image capture device. An enabled in-range device may be any in-range device which is operating in a publicly-detectable mode, or a device operating in a privately-detectable mode which has designated the image capture device as an allowed connection. After detecting enabled devices, the process 400 moves to step 410 and connects to the detected devices.

After connecting to enabled devices, the process 400 moves to step 415, and the image capture device receives network information from connected devices. Such information may comprise data representing the connections of a connected device to other devices. In a mesh network system, the network information may comprise relationships between some or all of the nodes in the network. The process 400 then transitions to step 420, in which the image receives user information from each networked device. The user information may comprise contact information, sharing settings, network settings, GPS coordinates or other location information, and/or privacy preferences.

The process 400 transitions to step 425, in which the image capture device periodically checks for what devices are in-range and enabled and for new devices which are out of the communication range of the image capture device but are part of the network. The process 400 may also check for previously connected mesh network nodes which have moved out of network or shut off, and may update the network connection information due to a changing topology of mobile nodes.

For example, at step 430 the process 400 checks for a new device detected by the image capture device. If a new device is detected, the process 400 loops back to step 410 so that the image capture device can connect to the new device and receive information from it. The process 400 moves to step 435 in which the network is analyzed for new networked devices. If a new device is detected in the network, the process 400 loops back to step 420 so that the image capture device can receive information about the user of the new device. In a mesh network context, a new node or nodes may be incorporated into the mesh network along with any other nodes connected to the new node.

At block 440, the process 400 performs the step of capturing an image. This may be a still image or a video. The process 400 then moves to step 445 to triangulate locations of networked devices. As described above, this may involve an analysis of connection relationships between devices in the network. If location coordinates such as GPS data were provided for any device in steps 415 and 420, such location information may be used in triangulating locations of other devices. Triangulating the locations of networked devices may further comprise determining which devices are located within the captured image scene.

The process 400 then moves to the final step 450 in which user information from devices determined to be within the captured image is associated with the captured image. This step 450 may comprise storing the captured image in association with the user data. In some embodiments, this step 450 may comprise providing the captured image to the users in the captured image via the user information, for example by sending the captured image to a user in a text message or email, or by tagging the user in an online photo album.

Figure 5:
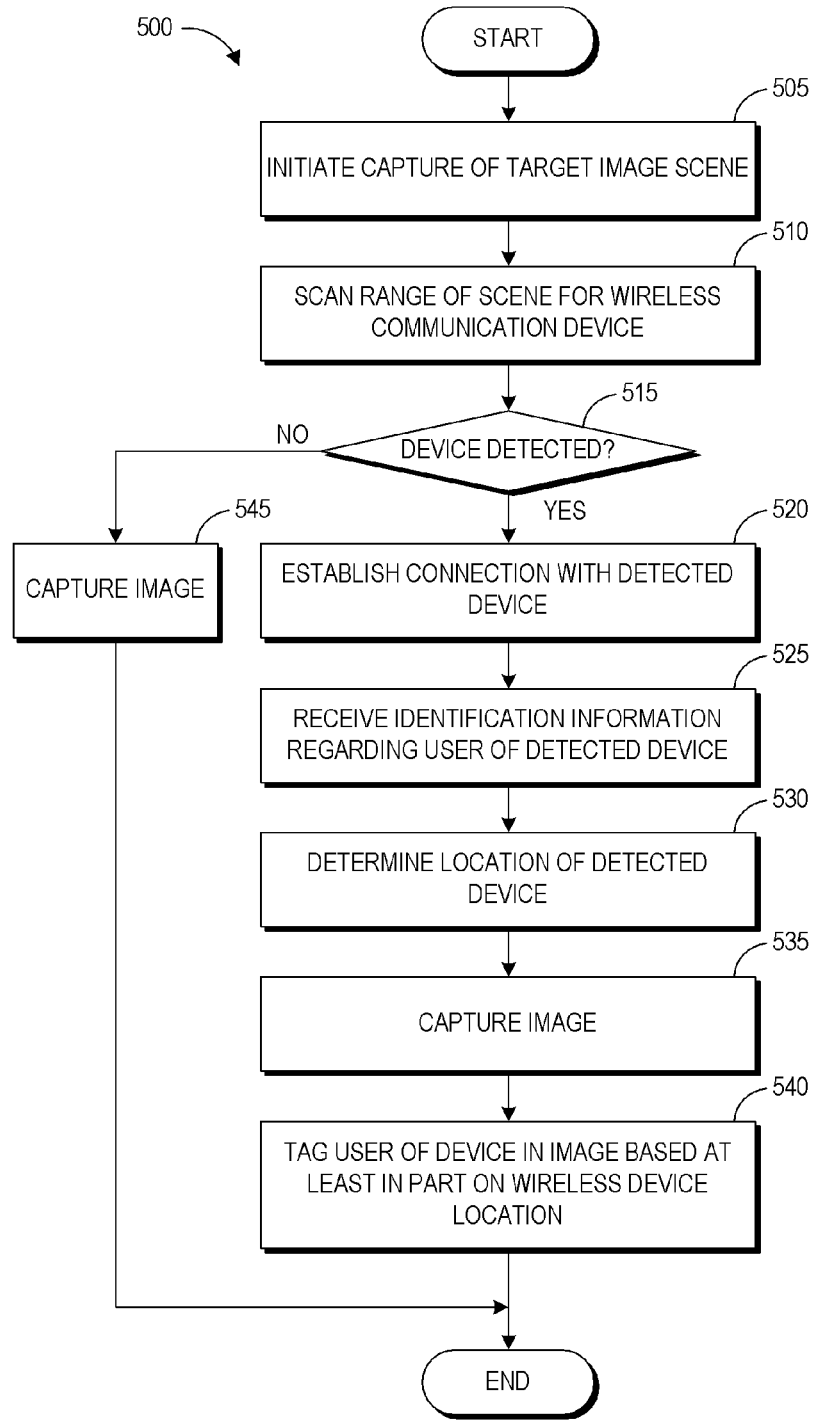
FIG. 5 illustrates an embodiment of a process for identifying persons in a captured image.

Another embodiment of a wireless identification image capture process 500 will now be described with greater detail with respect to FIG. 5. The image capture process 500 may take place in a network system such as described above with respect to FIGS. 1 and 2A-B, or in the image capture device 300 of FIG. 3.

The image capture process 500 begins at step 505 by initiating capture of a target image scene. The process 500 then moves to step 510, in which the image capture device scans a range of the target image scene for wireless communication devices. For example, the image capture device may be equipped with means for sensing directionality of the image capture device such as a compass, gyroscope and/or accelerometer. In an embodiment, the image capture device may use the direction-sensing means to determine an orientation of the image capture device and may scan an area in front of the camera's image sensor corresponding to the field of view of the image sensor.

If, at step 515, a device is not detected in the range of the image scene, the process 500 moves to step 545 in which a general image capture process is carried out. If, at step 515, a wireless device is detected in the range of the scene, the process 500 transitions to step 520 in which a connection is established with the detected device. The process 500 then moves to step 525 in which the image capture device receives identification information regarding a user of the detected and connected device. For example, the information may be any of the types of information described herein, such as contact information, location information, privacy preferences, etc.

The process then moves to step 530 in which a location of the detected device is determined or approximated. If location information, such as GPS or iGPS coordinates, was transmitted in step 525, the image capture device may use its own GPS or iGPS location data to calculate the relative location of the connected device. In some embodiments the location may be approximated based on signal strength and signal range of one or both of the devices, and may optionally be supplemented by the use of known facial-recognition techniques. The process then moves to step 540 in which the user of the connected device is tagged based at least in part on the wireless device location.

Figure 6:
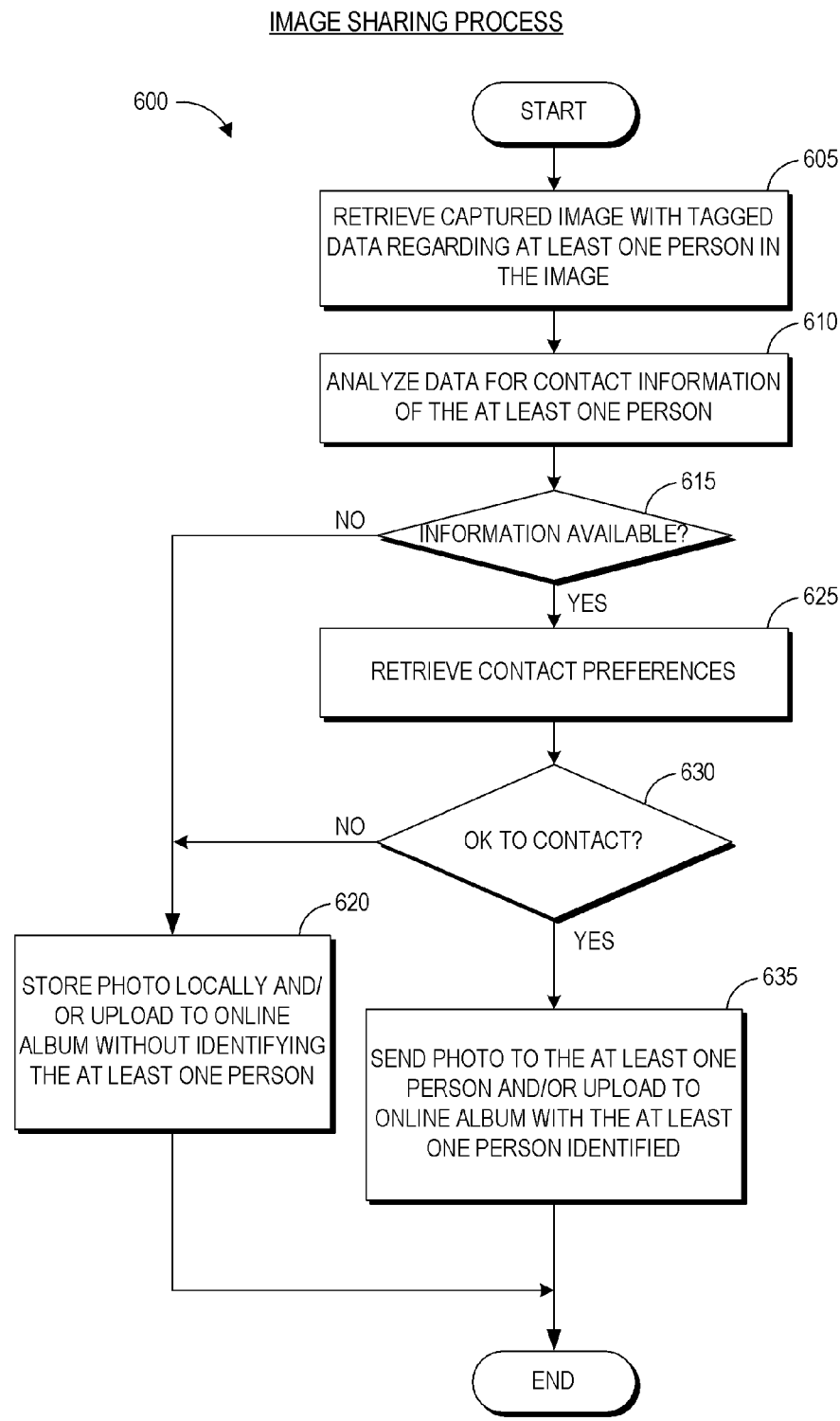
FIG. 6 illustrates an embodiment of a process for sharing captured images with the persons detected in the captured image.

FIG. 6 illustrates an embodiment of an image sharing process 600 which may take place after either of the wireless identification image capture processes 400, 500 described above. The sharing process 600 may be carried out by the tagging module 350 and wireless communication module 340 of FIG. 3.

The process 600 begins at step 605 in which an image which has been associated with user data is retrieved. The user data pertains to at least one person who has been identified as being present in the image. At step 610, the user data is analyzed for contact information. Contact information may comprise mobile phone number, email address, social networking presences, or any other suitable means of wirelessly transferring a copy of a captured image to the person. If, at step 615, the process 600 determines that no contact information is available, the process 600 moves to step 620 in which the image is stored locally and/or uploaded to an online album without identifying or tagging the at least one person. No contact information may be available, for example, due to the person's privacy preferences.

If the process 600 determines at step 615 that contact information of the at least one person is available, the process 600 transitions to step 625 in which contact preferences are retrieved. For example, the person may have specified that they wish to have images of them sent to an email address, or may desire to have the images tagged on a social networking website or application. Therefore, the process 600 moves to step 630 in which the contact preferences are analyzed. If the person has specified that they do not wish to be contacted with images, then the process moves to step 620 in which the image is stored locally and/or uploaded to an online album without identifying or tagging the at least one person. If the person has specified that they may be contacted, then the process 600 transitions to step 635. At step 635, the image is sent to the person based on the contact preferences, such as by uploading to an online album and tagging or otherwise identifying the person.

Figure 7:
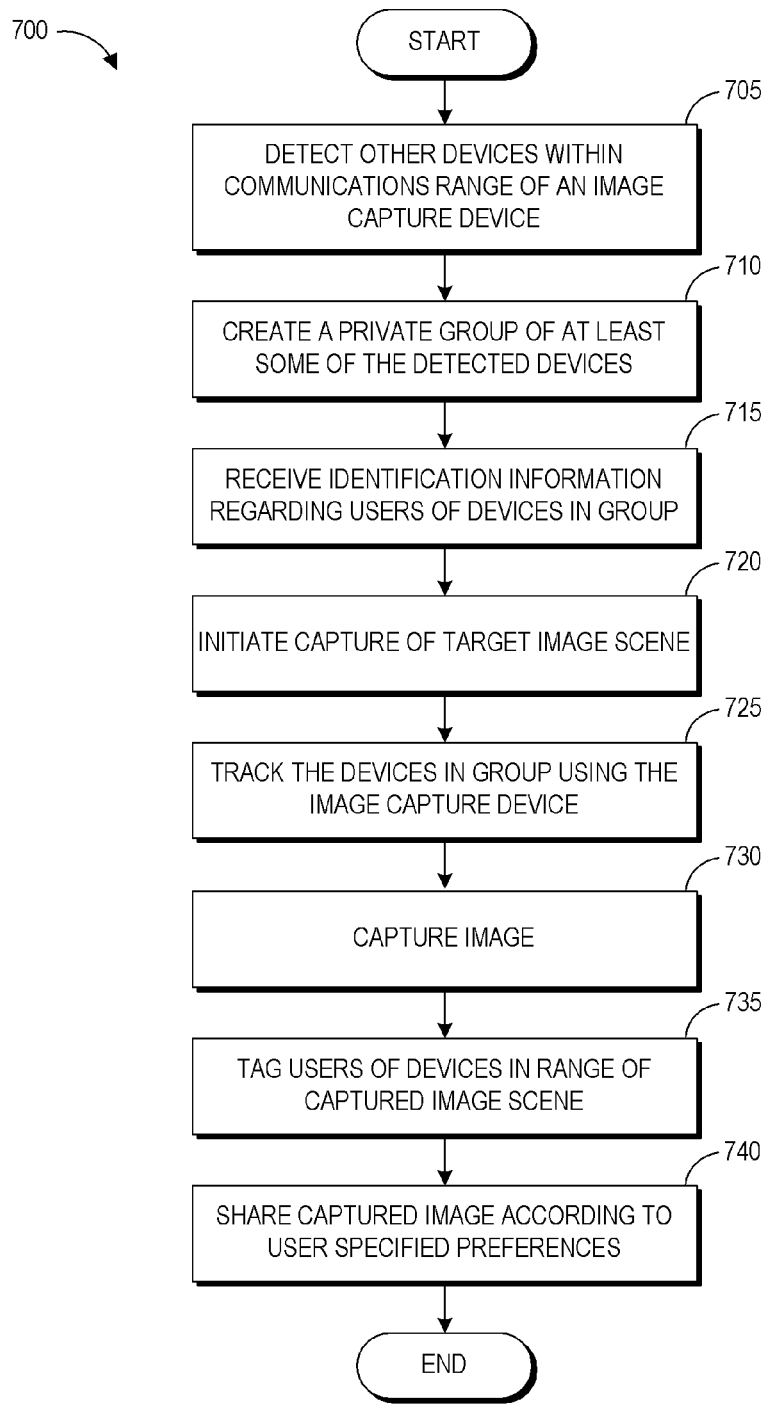
FIG. 7 illustrates an embodiment of an image sharing process for a local group.

FIG. 7 is a flow chart illustrating a local group image sharing process 700 that runs within one embodiment of the networked image capture system described above with respect to FIGS. 1 and 2A-B, and which may take place in the various modules of image capture device 300 of FIG. 3. The process 700 may be used, for example, when a user of an image capture device wants to connect to only a small group of known users rather than connecting to a large mesh network. The process 700 begins at block 705 where an image capture device detects other devices within communications range. In some embodiments, the communications range may be a WiFi or Bluetooth range of the image capture device. In other embodiments, for instance embodiments in which the image capture device is incorporated into a mobile communications device or smart phone, the communication range may be based on connection to a satellite network or other telecommunications network. Then the process 700 moves to block 710 in which the image capture device creates a private group comprising at least some of the devices detected within communications range. Viewing the available devices and creating the private group can be accomplished, for example, through an interface presented on the image capture device and controlled by software or a mobile application.

The process 700 then transitions to block 715 in which the image capture device receives identification information regarding users of devices in a group. As discussed above, the identification information may comprise names and contact information of the users of other devices in the local group. At block 720 the image capture device initiates capture of a target image scene, and then the process 700 transitions to block 725 in which the locations of the other devices in the local group are tracked. At block 730 the process 700 captures the target image.

At block 735 the process 700 determines a range of the target image scene and tags the users of the other devices who are located within the range. At block 740 the process 700 shares the captured image according to user-specified preferences. For example, in some embodiments everyone in the local group may wish to receive a copy of the captured image regardless of whether their device is determined to be within the target scene range. Some users may specify that another person not in the local group would like to receive a copy of images in which that user appears. In some embodiments, only the users whose devices are determined to be within the target scene range may receive a copy of the captured image. In other embodiments all photos for a specified period of time, for instance a duration of a vacation the members of the local group are taking together, may be stored in an album which is accessible to the local group members.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, processor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor such as a Pentium® processor, a Pentium® Pro processor, a 8051 processor, a MIPS® processor, a Power PC® processor, or an Alpha® processor. In addition, the processor may be any conventional special purpose processor such as a digital signal processor or a graphics processor. The processor typically has conventional address lines, conventional data lines, and one or more conventional control lines.

The system is comprised of various modules as discussed in detail. As can be appreciated by one of ordinary skill in the art, each of the modules comprises various sub-routines, procedures, definitional statements and macros. Each of the modules are typically separately compiled and linked into a single executable program. Therefore, the description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system may be used in connection with various operating systems such as Linux®, UNIX® or Microsoft Windows®.

The system may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system may also be written using interpreted languages such as Perl, Python or Ruby.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more example embodiments, the functions and methods described may be implemented in hardware, software, or firmware executed on a processor, or any combination thereof. If implemented in software, the functions may be stored on or transmitted over as one or more instructions or code on a computer-readable medium. Computer-readable media include both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations,"

without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting.

What is claimed is:

1. An imaging system comprising:
    an image capture device comprising:
        a communication module having a wireless communication range, the communication module configured to communicate with a plurality of personal computing devices;
        a location triangulation module configured to determine a location of each of the plurality of personal computing devices using the communication module;
        an image capture module configured to capture a target image of a scene, and
        a tagging module configured to identify a subset of the plurality of personal computing devices that are located within a range of the scene;
        wherein the communication module is further configured to:
            receive contact information of users associated with at least some of the subset of the plurality of personal computing devices, and
            automatically share the target image with the users using the contact information; and
        wherein at least one of the plurality of personal computing devices is located outside of the wireless communication range of the image capture device, and wherein the at least one of the plurality of personal computing devices located outside of the wireless communication range is configured to form an ad-hoc network with the image capture device.

2. The system of claim 1, wherein the image capture device is configured to periodically check for new personal computing devices within the wireless communication range.

3. The system of claim 1, wherein the image capture device is configured to periodically check for new personal computing devices within the mesh network.

4. The system of claim 1, wherein the contact information comprises one or more of mobile phone number, email address, and social networking presences.

5. The system of claim 1, wherein sharing the target image with the users using the contact information comprises sending the target image to the users using at least one of a mobile phone number or an email address.

6. The system of claim 1, wherein the contact information comprises:
    at least one social networking presence of a user associated with a personal computing device of the subset of the plurality of personal computing devices; and
    privacy preferences of the user regarding sharing of photos of the user.

7. The system of claim 6, wherein automatically sharing the target image via the communication module comprises:
    uploading the target image to the at least one social networking presence; and
    tagging the user in compliance with the privacy preferences.

8. The system of claim 1, wherein automatically sharing the target image via the communication module comprises:
    uploading the target image to a digital album; and
    sending a link to the digital album to the users based on the contact information.

9. A method of capturing a target image using an image capture device, comprising:
    connecting, via the image capture device, to a plurality of personal computing devices, each of the plurality of personal computing devices associated with one of a plurality of users, wherein the connecting comprises:
        connecting to a first personal computing device located within a wireless communication range of the image capture device;
        connecting to a second personal computing device located outside of the wireless communication range of the image capture device, wherein the second personal computing device is configured to form an ad-hoc network with the image capture device;
    receiving contact information from at least some of the plurality of personal computing devices regarding the associated one of the plurality of user;
    capturing the target image; and
    for each device of the plurality of personal computing devices:
        determining a location of the device;
        identifying, based at least partly on the location, whether the device is located within a range of the target image; and
        in response to identifying that the device is located within the range:
            associating the location and the contact information with the target image; and
            automatically sharing the target image with the associated one of the plurality of users using the contact information.

10. The method of claim 9, further comprising:
    determining whether any additional personal computing devices of the plurality of personal computing devices are networked with the first personal computing device; and
    forming the ad-hoc network with the additional personal computing devices.

11. The method of claim 9, further comprising receiving, from at least one of the plurality of personal computing devices, privacy preferences of the associated one of the plurality of users, and wherein sharing the target image further comprises complying with the privacy preferences.

12. The method of claim 9, wherein determining the location of the device is based at least in part on a known location of the image capture device and on a connection of the device with the image capture device.

13. The method of claim 9, wherein determining the location of the device is based at least in part on GPS coordinates.

14. An imaging system for capturing a target image, comprising:
an image capture device having a wireless communication range; and
at least one personal computing device located outside of the wireless communication range of the image capture device on or near a person in the target image, the at least one personal computing device configured to communicate with the image capture device, wherein the at least one personal computing device located outside of the wireless communication range is configured to form an ad-hoc network with the image capture device;
wherein the image capture device is configured to:
track a location of the at least one personal computing device,
receive information from the at least one personal computing device regarding the person,
capture the target image,
determine whether the at least one personal computing device is within a range of the target image, and
in response to determining that the at least one personal computing device is within the range, automatically share the target image with the person using the contact information.

15. The system of claim 14, wherein the at least one personal computing device comprises a cellular phone, smart phone, tablet computer, digital camera, GPS, or personal locator beacon.

16. The system of claim 14, wherein the image capture device and the at least one personal computing device each connect to and communicate with, via low-power wireless technology, a node comprising an additional computing device in the ad-hoc network.

17. The system of claim 16, wherein the low-power wireless technology comprises at least one of near field communication, infrared communication, Bluetooth, GPS, iGPS, Wi-Fi, WLAN, and radio frequency.

18. The system of claim 14, wherein the information comprises one or more of mobile phone number, email address, and social networking presence.

19. The system of claim 14, wherein the information comprises privacy preferences for available actions regarding sharing of photos of the person.

20. The system of claim 19, wherein the at least one personal computing device is configured to automatically send the privacy preferences to any connected image capture device.

21. The system of claim 19, wherein the image capture device is configured to comply with the privacy preferences.

22. The system of claim 14, further comprising identifying a location of the person in the target image based at least in part on the tracked location of the at least one personal computing device and storing the location of the person in association with the target image.

23. A method of capturing a target image using an image capture device, comprising:
connecting, via a node in an ad hoc network, to at least one personal computing device located on or near a person in the target image and located outside of a wireless communication range of the image capture device, wherein the at least one personal computing device located outside of the wireless communication range is configured to form the ad-hoc network with the image capture device;
capturing a target image;
determining a location of the at least one personal computing device;
determining whether the location is within a range of the target image; and
in response to determining the location is within the range:
receiving information from the at least one personal computing device regarding the person; and
automatically sharing the target image with the person using the information.

24. The method of claim 23, wherein the image capture device connecting to the node:
determining a field of view of the target image;
scanning the field of view for personal computing device signals; and
detecting and connecting to an additional personal computing device comprising the node, the additional personal computing device configured to form the ad hoc network with the image capture device and the at least one personal computing device.

25. The method of claim 24, wherein connecting to the additional personal computing device comprises preconfiguring the image capture device and the additional personal computing device as a local group.

26. The method of claim 23, wherein the information comprises contact information of the person, the contact information comprising a mobile phone number and/or an email address of the person, and wherein sharing the target image comprises sending the target image to the mobile phone number and/or email address.

27. The method of claim 23, wherein the information comprises:
social networking presences of the person; and
privacy preferences of the person for available actions regarding sharing of photos of the person.

28. The method of claim 27, wherein automatically sharing the target image comprises:
determining social networking presences of a user of the image capture device;
determining common social networking presences of the user and the person;
uploading the target image to the social networking presences of the user; and
tagging the person on the common social networking presences, wherein tagging is done in compliance with the privacy preferences of the person.

29. The method of claim 23, wherein automatically sharing the target image comprises:
uploading the target image to a digital album; and
sending a link to the album to the person based on contact information in the information read from the at least one personal computing device.

30. A non-transitory computer readable medium storing instructions, which, when executed, cause a processor associated with an image capture device to:
connect, via a node in an ad-hoc network, to at least one personal computing device located on or near a person and located outside of a wireless communication range of the image capture device, wherein the at least one personal computing device located outside of the wireless communication range is configured to form an ad-hoc network with the image capture device;
determine a location of the at least one personal computing device;

capture a target image;
determine whether the location is within a range of the target image; and
in response to determining the location is within the range:
- receive information from the at least one personal computing device regarding the person; and
- automatically share the target image with the person using the information.

31. The non-transitory computer readable medium of claim 30, the instructions further configured to cause the processor to identify a location of the person in the target image based at least in part on the tracked location of the at least one personal computing device and to store the location of the person in association with the target image.

32. An image capture device comprising:
- means for connecting to at least one personal computing device located on or near a person outside of a wireless communication range of the image capture device, the at least one personal computing device configured to form an ad-hoc network with the image capture device;
- means for determining a location of the at least one personal computing device;
- means for capturing a target image;
- means for determining that the location is within a range of the target image;
- means for receiving information from the at least one personal computing device regarding the person; and
- means for automatically sharing the target image with the person using the information.

\* \* \* \* \*